July 7, 1959

H. B. SCHULTZ 2,893,505

HYDRAULIC REACTION CONTROL IN A POWER STEERING SYSTEM

Filed June 7, 1955

INVENTOR.
HAROLD B. SCHULTZ
BY
William N. Antonis
ATTORNEY

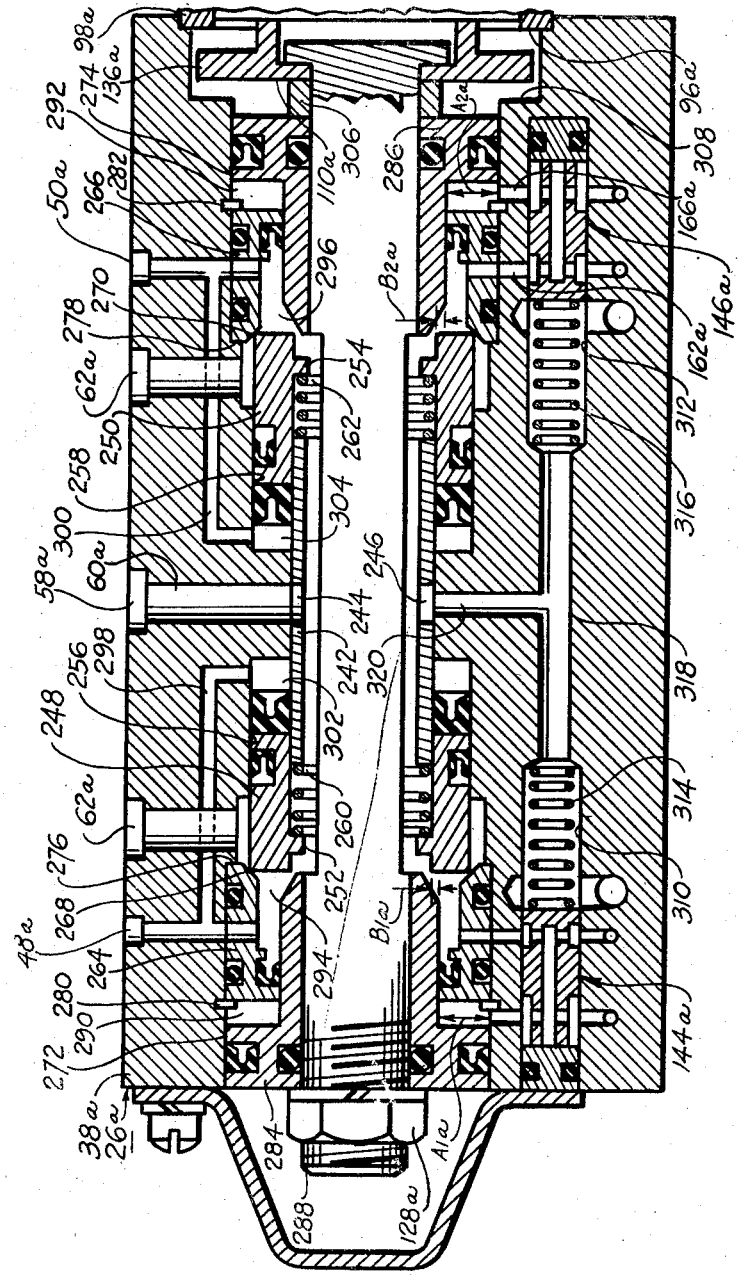

United States Patent Office 2,893,505
Patented July 7, 1959

2,893,505

HYDRAULIC REACTION CONTROL IN A POWER STEERING SYSTEM

Harold B. Schultz, South Bend, Ind., assignor to Bendix Aviation Corporation, South Bend, Ind., a corporation of Delaware Application June 7, 1955, Serial No. 513,834

16 Claims. (Cl. 180—79.2)

The present invention relates to fluid power steering, and more specifically to improvements in a control valve, of the type disclosed in S. I. MacDuff's application Serial No. 457,836.

An object of the invention is to provide a control valve in a power steering system for a vehicle which maintains adequate driver feel through the entire steering range from parking to high speeds.

Another object is to control the ratio of power applied to manual effort.

A further object of the invention is to provide a control valve in a power steering system having hydraulic reaction which increases at one rate up to a predetermined pressure and increases at another rate at pressures above said predetermined pressure.

A primary object of the invention is to provide a control valve of the reaction type for power steering having first and second reaction chambers wherein the pressure in the first chamber is automatically limited to a predetermined value while the pressure in the second reaction chamber is free to rise unchecked.

The above and other objects and features of the invention will become apparent from the following description of the apparatus taken in connection with the accompanying drawings which form a part of this specification and in which:

Figure 3 is an enlarged fragmentary section of a closed center valve incorporating my invention.

Figure 1:
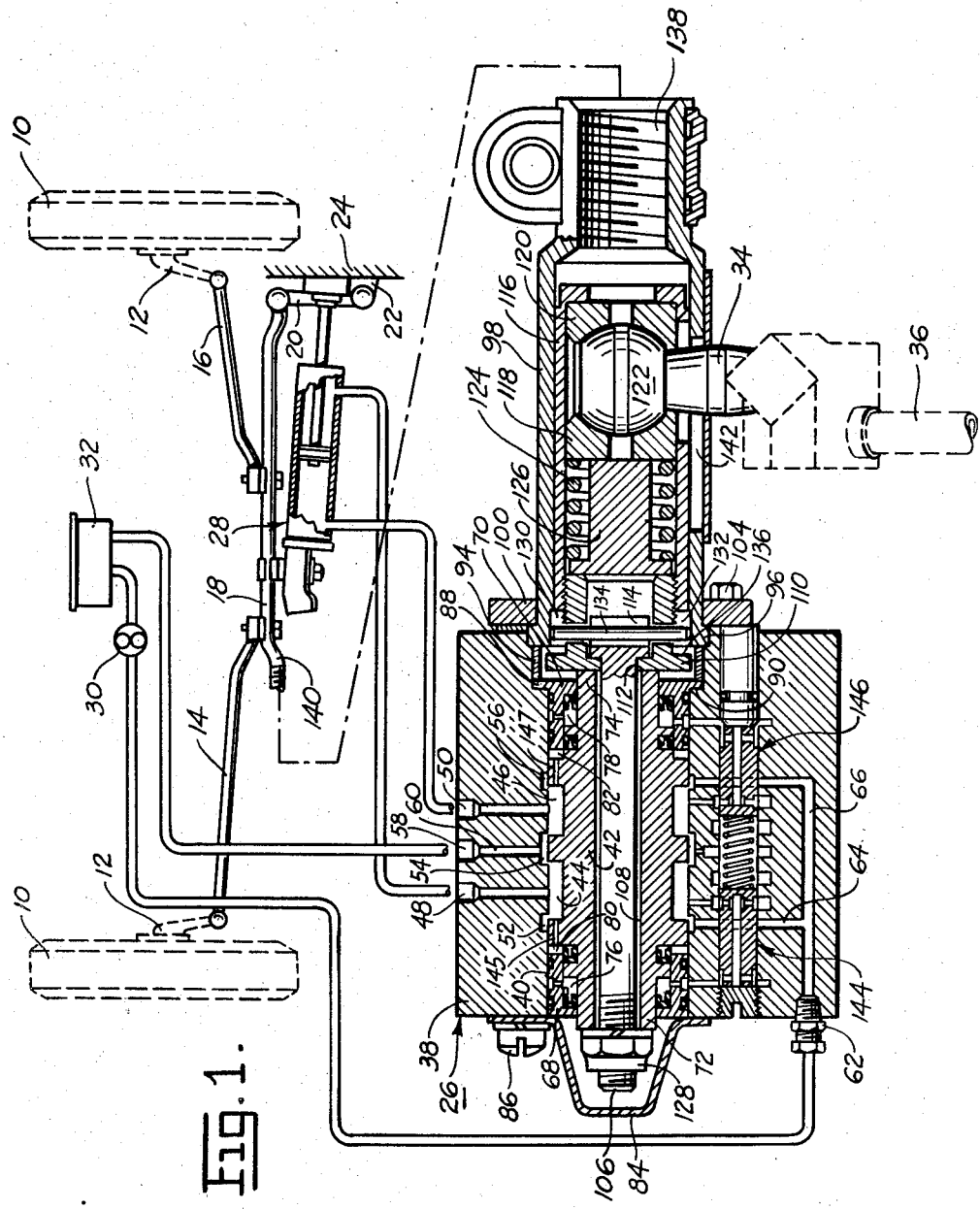
Figure 1 is a schematic showing of a hydraulic power steering system illustrating my invention in association with an open center valve, shown in enlarged section.

Referring to Figure 1 of the drawings, numeral 10 designates steerable wheels of a vehicle. Spindle arms 12 are associated with the wheels 10 and are connected to the vehicle steering linkage which is comprised of spindle tie rods or side links 14 and 16, cross tie rod 18, idler arm 20, and idler arm bracket 22 which in turn is secured to the vehicle structure 24. The steering linkage is connected to a hydraulic system which includes a control valve 26, a power cylinder 28, a pump 30, a reservoir 32, and the requisite pipe lines which will be discussed in more detail in the subsequent paragraphs. The control valve 26 is actuated through ball stud 34 which is operatively connected to the steering shaft 36.

The control valve 26 is comprised of a housing member 38 having a bore 40 therein. A valve member 42 lies within the bore 40 and is movable in opposite directions from a normally neutral or center position, thereby controlling flow in the hydraulic system. The valve member 42 is formed with two annular channels 44 and 46 which communicate with cylinder ports 48 and 50 respectively. The bore 40 of the valve housing is provided with annular channels 52, 54, and 56. Annular channel 54 is in communication with a return port 58 by way of passage 60. Annular channels 52 and 56 communicate with an inlet port 62 through passages 64 and 66. The control valve shown in Figure 1 is an open center type valve which in neutral position allows free flow of the hydraulic fluid between the inlet port 62 and the return port 58 via the annular channels which are arranged in overlapping relationship.

Sealing bushings 68 and 70 are located in opposite ends of the bore 40 and at the reduced ends 72 and 74 of the valve member 42 thereby forming first reaction chambers 76 and 78 and second reaction chambers 80 and 82. As will hereinafter be described reaction chambers 76 and 78 are subject to a variable pressure only up to a predetermined value, at which time the pressure is automatically cut off at that value. Chambers 80 and 82 are subject to an unlimited variable pressure which is in constant communication with said chambers. These reaction chambers are in effect hydraulic pressure reaction means built into the control valve in order to oppose movement of the valve member 42 away from its neutral position. In other words, the hydraulic pressure communicated to these chambers acts on the member tending to oppose relative movement from neutral and when such movement occurs to restore it to a neutral position. The effective annular reaction areas $A_1$ and $A_2$ of the first reaction chambers and the effective annular reaction areas $B_1$ and $B_2$ of the second reaction chambers, as shown in Figure 1, may be equal or unequal, as between themselves or as between each other depending on the desired steering characteristics.

The bushing 68 is retained in the bore 40 by an end cap 84 which engages the outer side of the bushing. Bolts 86, only one of which is shown, secure the end cap to the housing member 38. The bushing 70 includes a flange 88 which engages a shoulder 90 formed in a counter bore 92 located at the end of the bore 40. A spacer ring 94 is arranged in the counterbore between the flange 88 and inner end 96 of the sleeve 98. A ring 100 slides over the sleeve 98 for engagement with a shoulder 102 formed at the inner end 96 of the sleeve for securing the sleeve 98, spacer ring 94, and bushing 70 in assembled relationship. Bolts 104, only one of which is shown, hold the ring 100 against the end of the housing member.

The valve member 42 is operatively connected to the ball stud 34 for sliding movement in the bore. The connection to the stud is an assembly of parts comprising a bolt 106, extending through a central passage 108 of the valve member, a stop bushing 110 having an opening 112 therein which passes the small diameter of the bolt but not the enlarged end 114, an inner sleeve 116 the inner end of which threadedly engages the stop bushing 110, members 118 and 120 providing sockets for a spherical end 122 of the stud, a spring 124, and a ball socket member 126. With nut 128 tightened down against the end 72 of the valve member, movement of the ball stud will cause the valve member and assembly to move as a unit in the housing 38 and sleeve 98. The inner end of the sleeve 98 is slotted at 130 and 132 to receive the ends of pin 134 thereby preventing rotation of the assembly in the bore. The pin 134 passes through the stop bushing 110 and enlarged end 114 of the bolt 106 in order to prevent the latter from turning when the nut 128 is applied thereto.

Figure 2:
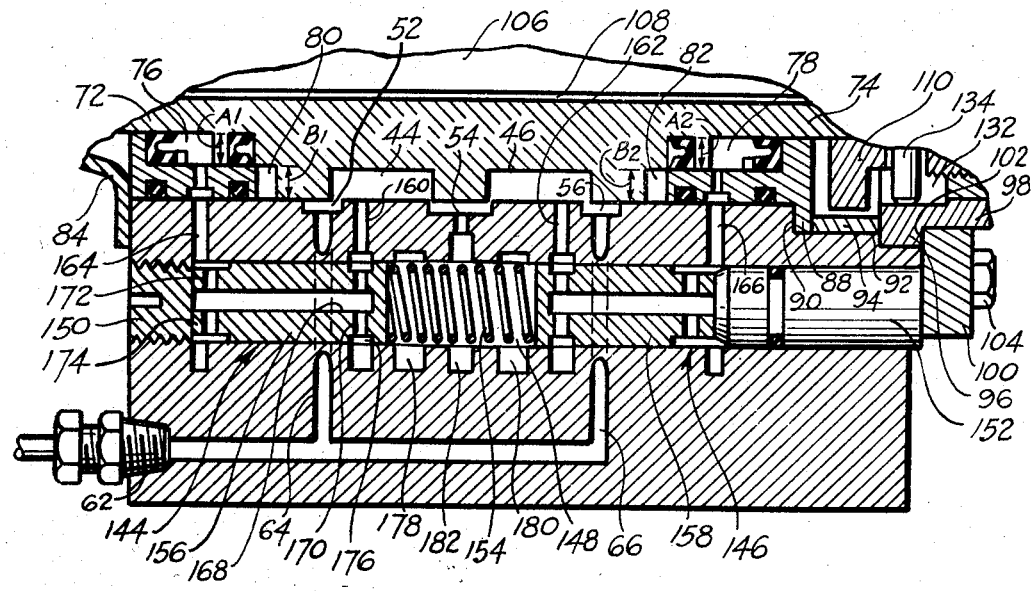
Figure 2 is an enlarged fragmentary section of the open center valve of Figure 1.

Note that the stop bushing 110 has a radially extending flange 136 which engages the inner end 96 of the sleeve 98 when the valve member is moved to the right as viewed in Figure 2, and the outer side of the sealing bushing 70 when the valve member is moved to the left. This positive engagement between the stop bushing 110 and the housing member 38 after a predetermined movement of the valve member permits manual steering in the event of power failure. The end of sleeve 98 is threaded at 138 so that it may be connected to the end 140 of the cross tie rod 18. The sidewall of the sleeve 98 is provided with an axially extending opening 142 to permit movement of the ball stud as explained above.

Regulating valve means 144 and 146, as shown in S. I. MacDuff's application No. 457,836, control the pressures in the reaction chambers 76 and 78 respectively. Reaction chambers 80 and 82 are in direct communication with annular channels 44 and 46 via passages 145 and 147. The pressures in chambers 80 and 82 are not limited to any predetermined value as are the pressures in chambers 76 and 78. The regulating valves are arranged in a bore 148 of the housing member. Plugs 150 and 152 close the ends of the bore against leakage to atmosphere. A spring 154 arranged between the adjacent ends of the valve elements 156 and 158 urges the respective elements against the plugs 150 and 152. The spring is designed to be overcome when the pressure acting over the areas of the valve elements adjacent the plugs reaches a predetermined value. Passages 160 and 162 connect annular channels 44 and 46 respectively with the bore 148. Passages 164 and 166 connect the limited reaction chambers 76 and 78 with the bore 148.

Since the valve elements 156 and 158 are identical, only one will be described. An axial passage 168 connects radial passage 170 with radial passages 172. The outer end 174 of each valve element is of reduced diameter so that the ends of the valve elements will not cover the passages 164 and 166. The radial passage 170 terminates at its outer end in an annular groove 176 formed in the exterior surface of the element. The axial width of the groove 176 of each element is less than the axial distance between adjacent edges of passages 160 and counterbore 178, on the one hand, and passage 162 and counterbore 180, on the other hand. A passage 182 connects bore 148 with annular channel 54, which is connected to the return port 58. With the valve elements shifted inwardly against the spring 154 so that the edges of the groove of each element lie between the adjacent edges of the passages 160 and 162 and the counterbores 178 and 180, respectively, communication to the reaction chambers 76 and 78 is cut off. Any further shifting inwardly of the valve elements so that the edge of the groove of each element overlaps the edge of its associated counterbore will establish communication between the chambers and the return port 58 via the central portion of the bore 148 and passage 182.

Operation of the open center control valve is as follows:

With the parts of the control valve 26 in the position shown in Figures 1 and 2, the valve is in hydraulic balance. This is the neutral or center position of the valve. Fluid under pressure enters inlet port 62, divides into the annular channels 52 and 56, from whence the fluid passes into the annular channels 44 and 46 respectively, and from these latter channels the fluid is directed into the annular channel 54 which is connected to the return port. The regulating valves 144 and 146 are in a position at this time to connect the pressure existing in the annular channels 44 and 46 to the chambers 76 and 78 respectively.

Let us assume that it is desired to turn the wheels to the left in Figure 1. This will require shifting the valve member to the right. This movement of the valve member tends to restrict communication between annular channels 44 and 52 and increase communication between annular channels 46 and 56. Since annular channel 44 is connected to the reaction chamber 76 via the passage 160, regulating valve 144, and passage 164 and to the reaction chamber 80 via passage 145, pressure in the chambers 76 and 80 will be reduced. Also since annular channel 46 is connected to the reaction chamber 78 via the passage 162, regulating valve 146, and passage 166, and to the reaction chamber 82 via passage 147, pressure in the chambers 78 and 82 will increase. The pressures in the chambers 78 and 82 act on the end of the valve member and the bushing 70, opposing further movement of the valve member with a force equal to the effective area of the movable walls multiplied by the unit pressure in the chambers. This force which is in the form of a reaction force is transmitted to the operator of the vehicle through the ball stud 34. The pressures in the reaction chamber 78 and the reaction chamber 82 will be equal to the pressure in the annular channel 46 up to a predetermined value.

If the resistance offered to steering becomes sufficiently great so as to cause the pressure required for power assistance to exceed the predetermined value, regulating valve 146 will come into action, shutting off communication between the reaction chamber 78 and the annular channel 46. However, the pressure in the reaction chamber 82 will continue to increase even above the predetermined value as the pressure in the annular channel 46 increases above such value. Consequently, after the predetermined value is reached, the reaction or "feel" transmitted to the operator will continue to increase, but at a lesser rate. The rates of increase above and below the predetermined value depend on the relationship of the reaction areas.

In making a turn to the right, regulating valve 144 would control the pressure in the reaction chamber 76 and the above described process would be repeated, only in reverse.

Figure 3 of the drawings represents a closed center valve, having first and second reaction areas, which may be used in a power steering system similar to that shown in Figure 1. The variable pressure exerted against the first reaction area is automatically limited to a predetermined value while the pressure exerted against the second reaction area is free is rise unchecked. In Figure 3, parts corresponding to those already described in connection with the embodiment of Figure 1 are given the same numeral with the subscript $a$ affixed thereto. The closed center valve is connected to an accumulator, reservoir, pump, and an unloading valve, none of which are shown, as is commonly known to those skilled in the art.

The valve of Figure 3 comprises a housing member 38$a$ having cylinder ports 48$a$ and 50$a$, return port 58$a$, and inlet ports 62$a$. A sleeve 242, with openings 244 and 246 therein, lies within said housing. Annular valve members 248 and 250, having shoulders 252 and 254 formed thereon, lie within counterbores 256 and 258 respectively. Between the shoulder 252 and the sleeve 242 lies a spring 260. Spring 262 lies between shoulder 254 and the sleeve 242. Sealed bushings 264 and 266 having annular valve seat 268 and 270 formed thereon, are located within counterbores 272 and 274. Sealed bushings 264 and 266 are held in place by shoulders 276 and 278 and retaining rings 280 and 282. Annular valve actuating members 284 and 286 lie within counterbores 272 and 274 respectively and are carried by bolt 288. Reaction chambers 290 and 292 are formed by sealed bushings 264 and 266 and annular valve actuating members 284 and 286. Reaction chambers 294 and 296 are formed by the annular valve members, sealed bushings and annular valve actuating members. Passages 298 and 300 equalize the pressures in chambers 302 and 304 with the pressures in the reaction chambers 294 and 296, thereby balancing the pressures on both sides of the valve members.

The effective first reaction areas $A_{1a}$ and $A_{2a}$ and the effective second reaction areas $B_{1a}$ and $B_{2a}$ are formed on the valve actuating members 284 and 286 as shown in Figure 3. Once again, the effective first and second reaction areas may be equal or unequal as between themselves or as between each other, depending on the steering characteristics desired.

The annular valve actuating members 284 and 286 are operatively connected to the ball stud (not shown) for sliding movement within the valve housing. A spacer ring 306 is arranged between the annular valve actuating member 286 and stop bushing 110a. With nut 128a not tightened down against the annular valve actuating member 284, movement of the ball stud will cause the valve actuating members 284 and 286 to move as a unit within the housing 38a. The nut 128a, spacer ring 306 and pressures exerted against the effective reaction areas $A_{1a}$, $A_{2a}$, $B_{1a}$ and $B_{2a}$ keep the valve actuating members 284 and 286 in proper alignment. The stop bushing 110a has a radially extending flange 136a which engages the inner end 96a of the sleeve 98a when the valve is moved to the right, as viewed in Figure 3, and the shoulder 308 of the housing 38a when the valve actuating member is moved to the left. This positive engagement between the stop bushing 110a and the above mentioned members after a predetermined movement of the valve actuating members permits manual steering in the event of power failure.

The regulating valves 144a and 146a are similar in construction and operation to those shown in Figure 1 except that they lie in separate bores 310 and 312, each having a separate spring 314 and 316 therein. Each spring is designed to be overcome when the pressure acting over the areas of the valve elements reaches a predetermined value. Passages 318 and 320 establish communication between the bores and the return port 58a, when the regulating valves overshift.

Operation of the closed center control valve is as follows:

The control valve 26a, as shown in Figure 3, is in a neutral or center position. In this position there is no hydraulic circulation. Assume that the valve actuating members 284 and 286, which are operatively connected to the ball stud 34a, are moved to the left. Such movement will cause valve actuating member 286 to unseat valve member 250 from valve seat 270. Hydraulic fluid will then flow to one side of the power cylinder via inlet port 62a, reaction chamber 296, and cylinder port 50a. Hydraulic fluid will flow from the other side of the power cylinder to the return port 58a via cylinder port 48a, chamber 294, and passage 60a. At the same time fluid will pass to the reaction chamber 292 via the passage 162a, regulating valve 146a, and passage 166a increasing the pressure therein. The pressures in the chambers 292 and 296, act on the effective reaction areas $A_{2a}$ and $B_{2a}$ of the valve actuating member 286 opposing further movement of said member with a force equal to the effective areas multiplied by the unit pressure in the chambers. This force which is in the form of a reaction force is transmitted to the operator of the vehicle through the ball stud.

If the resistance offered to steering becomes sufficiently great so as to cause the pressure required for power assistance to exceed a predetermined value, regulating valve 146a will come into action shutting off communication to the reaction chamber 292 as previously described. The pressure exerted against the effective reaction area $B_{2a}$ of reaction chamber 296 is limited in no manner. Consequently, just as in the open center valve, after the predetermined value is reached, the reaction or "feel" transmitted to the operator will continue to increase, but at a different rate.

Movement of the valve actuating members to the right will cause valve actuating member 284 to unseat valve member 248 from valve seat 268. Regulating valve 144a will control the pressure in the reaction chamber 290 and the above described sequence will be repeated, only in reverse.

Figure 4:
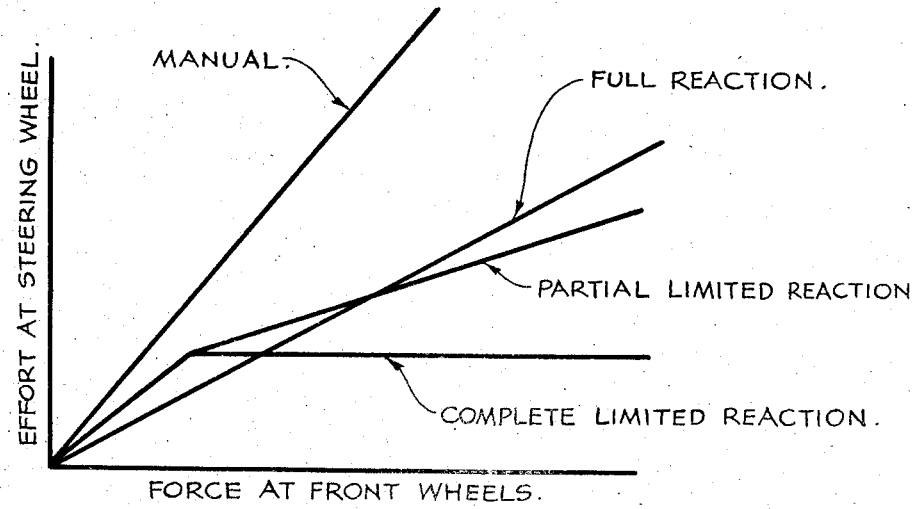
Figure 4 is a graph showing the relationship of steering wheel effort vs. force at front wheels for various types of power steering systems.

In the graph of Figure 4, effort at the steering wheel is plotted against force at the front wheels. In this manner, the steering characteristics of manual steering may be compared to power steering systems having a full reaction, a complete limited reaction (as in MacDuff's application No. 457,836) and a partial limited reaction as in the instant case. The full reaction curve shown on the graph shows the effect of using a control valve having reaction areas subject to variable pressures which are not limited in any manner, while the complete limited reaction curve shown illustrates the type of steering obtained by use of a control valve of the type disclosed in MacDuff's application No. 457,836 wherein increased reaction is cut out after a predetermined pressure is reached. The partial limited reaction curve characteristics are obtained by use of the hydraulic reaction control shown in my drawings. As previously stated, the effective reaction areas subject to variable pressures may be varied so as to create the desired steering characteristics. By varying these areas, the slope of the partial limited reaction curve may be made to fall anywhere between the full reaction curve and the complete limited reaction curve. Enlarging the reaction area subject to limited pressures and decreasing the reaction area subject to unlimited pressure will cause the partial limited reaction curve to fall nearer the horizontal. Reversal of the procedure will cause the curve to fall nearer the full reaction curve.

It is therefore obvious that I have invented a device for use with hydraulic power steering which is susceptible of being varied so as to obtain any desired steering characteristics.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. In a control valve having a housing member and valve means located therein, pressure reaction means associated with said valve means having first and second reaction areas subject to a variable pressure for opposing movement of said valve means from a neutral position, said pressure acting on said areas in the same direction, and pressure regulating valve means limiting the pressure acting on one of said reaction areas to a predetermined value.

2. A control valve having a housing with movable valve means located therein, hydraulic pressure reaction means associated with said valve means and having first and second reaction areas acted upon by variable pressure, said pressure acting on said areas in the same direction thereby opposing movement of said valve means from a normally neutral position, the pressure exerted against one reaction area remaining equal to said variable pressure, and pressure regulating means allowing said variable pressure to act on the other reaction area at or below a predetermined value and maintaining the pressure on said area at the predetermined value when said variable pressure rises above said predetermined value.

3. In a power steering mechanism for a motor vehicle having steered wheels, a steering wheel, a steering connection, and a differential fluid pressure motor connected to said steering connection, a follow-up control valve for said motor including a pair of valve members, one of said valve members being connected for operation by the steering wheel, hydraulic reaction means associated with the valve members comprising first and second reaction areas located at one end of one of said valve members, said reaction areas being subject to variable pressures for creating a force opposing relative movement of the valve members, said steering wheel being sensitive to the pressure build-up on said reaction areas, pressure regulating valve means responsive to said variable pressure for maintaining the pressure on one of said first and second reaction areas at or below a predetermined value, said pressure build-up on the reaction areas increasing at one rate up to the predetermined value and at a lesser rate thereafter.

4. In a power steering system for a vehicle equipped with steered wheels, a steering part, a tie rod associated with each wheel, and a power cylinder provided with a casing element and a piston element, one of which is connected to the tie rods and the other of which is connected to a fixed part of the vehicle structure, a control valve having members relatively movable from a neutral position for controlling flow to said power cylinder, one of said members being connected to said tie rods and the other being connected to said steering part, fluid connections from the control valve to the power cylinder, said control valve being provided with hydraulic pressure reaction means opposing relative movement of said members from neutral, said hydraulic pressure reaction means comprising first and second reaction chambers located at each end of said control valve, said hydraulic reaction producing a force proportional to the effort required to operate said steering part, and regulator valve means limiting hydraulic pressure in one of said reaction chambers above a predetermined value, thereby reducing the proportional steering effort after said predetermined value has been reached.

5. A control valve comprising a housing member with a bore therein, a valve member in said bore, an inlet port, a return port, two working ports, annular channels in said bore and on said valve member, the annular channels of the housing member overlapping the annular channels of the valve member, said annular channels being in communication with said ports, said valve member being movable from a neutral position thereby controlling flow in said channels, hydraulic pressure reaction means opposing relative movement of said valve member from neutral, said pressure reaction means comprising first and second reaction chambers located at each end of said valve member, said reaction chambers communicating with the working ports, and pressure regulating valve means limiting the pressure in one of said first and second chambers to a predetermined value.

6. A control valve comprising a housing member having a bore therein, a valve member movable in opposite directions from a normally neutral position within said bore, overlapping annular channels formed in said bore and on said valve member, movement of said valve member controlling flow in said channels, pressure chamber means subject to the pressure in one of said annular channels, said means comprising first and second reaction chambers located at each end of said valve member, reaction areas in said chambers providing movable walls associated with said members for opposing movement of said valve member from a normally neutral position, and pressure regulating means limiting the pressure in said first reaction chamber to a predetermined value, the pressure in said second reaction chamber always being equal to the pressure in the annular channel to which it is connected.

7. A control valve comprising a housing having a bore therein, a valve member movable within said bore, annular channels formed in said bore and on said valve member, an inlet port, an outlet port, two cylinder ports, said annular channels being arranged in overlapping relationship and in communication with said ports, hydraulic pressure reaction means located on each end of said valve member opposing relative movement of said valve member, said hydraulic pressure reaction means comprising first and second reaction chambers communicating with the cylinder ports via the annular channels formed in said valve member, regulating valve means interposed between said first reaction chambers and said annular channels communicating with said cylinder ports, said regulating valve means being responsive to variable pressures in said cylinder port thereby preventing the pressure in the first reaction chambers from exceeding a predetermined value.

8. A control valve comprising a housing member having a bore therein, a valve member movable in opposite directions from a normally neutral position within said bore, annular channels formed in said bore and on said valve member, an inlet port, an outlet port, two cylinder ports, said annular channels being arranged in overlapping relationship and in communication with said ports, hydraulic reaction areas formed on each end of said valve member, said hydraulic reaction areas comprising first and second reaction areas subject to variable pressures, said variable pressures opposing movement of the valve member from a normally neutral position, said pressure exerted on one of said first and second reaction areas increasing in direct proportion to the pressure at the cylinder port, pressure regulating valve means interposed between the cylinder port and the other of said first and second reaction areas thereby limiting the pressure acting on said other reaction area to a predetermined value, and operator operated means connected to said valve member, said last mentioned means being sensitive to the pressure build-up on said reaction areas.

9. A control valve comprising a housing member having a bore therein, a valve member within said bore and movable in opposite directions from a normally neutral position, annular channels formed in said bore and on said valve member, an inlet port, an outlet port, two cylinder ports, said annular channels being arranged in overlapping relationship and in communication with said ports, hydraulic pressure reaction means comprising first and second reaction chambers, passage means connecting one of said reaction chambers with the annular channels communicating with the cylinder ports thereby rendering the pressure in the one reaction chamber equal at all times to the pressure in the annular channels communicating with said cylinder ports, second passage means connecting the other of said reaction chambers with the annular channels communicating with the cylinder ports, regulating valve means located in said second passage means, said regulating valve means being responsive to variable pressures in said cylinder ports thereby preventing the pressure in the other of said reaction chambers from exceeding a predetermined value, said pressures in the first and second reaction chambers being equal to the pressures in the annular channels communicating with said chambers when the valve member is in a neutral position and up to a predetermined value after said valve member has moved from its neutral position.

10. A control valve comprising a housing having an inlet port, a return port, and two cylinder ports, valve means arranged within said housing, said valve means comprising an annular valve seat, an annular valve member seatable on said valve seat, and an annular valve actuating member capable of unseating said valve member, hydraulic pressure reaction means associated with said valve means, said hydraulic pressure reaction means comprising first and second reaction areas acted upon by variable pressure, said pressure acting on said areas in the same direction, thereby creating forces opposing the movement of the actuating valve member, said pressure exerted against one of said reaction areas being equal to the variable pressure at all times, and pressure regulating valve means limiting the pressure exerted against the other of said reaction areas to a predetermined value.

11. In a power steering system for a vehicle equipped with steered wheels, a steering part, a tie rod associated with each wheel, and a power cylinder provided with a casing element and a piston element, one of which is connected to the tie rods and the other of which is connected to a fixed part of the vehicle structure, a control valve connected to said tie rods and to said steering part, fluid connections from the control valve to the power cylinder, said control valve comprising a valve seat, a valve member, and valve actuating means, hydraulic pressure reaction means associated with said valve actuating means, said hydraulic pressure reaction means comprising first and second reaction areas subject to variable pressures, said pressures acting on said areas in the same direction, and regulating valve means limiting the variable pressures exerted against one of said reaction areas within a range below a predetermined value.

12. In a valve having a housing member, an inlet port, a return port and two cylinder ports, valve means within said housing controlling flow through the cylinder ports, said valve means comprising an annular valve seat, an annular valve member seatable on said valve seat, and an annular valve actuating member capable of unseating said valve member from said seat, hydraulic pressure reaction areas formed on said valve actuating member and subject to variable pressures, said pressures acting on said areas in the same direction thereby creating forces opposing movement of said valve actuating member, said reaction areas comprising a first and second reaction area, the pressure on one reaction area increasing in direct proportion to the pressure at the cylinder port, and pressure regulating means within said housing member maintaining the pressure on the other reaction area at or below a predetermined value.

13. A control valve having a housing member, an inlet port, an outlet port and two working ports, valve means located within said housing, said valve means comprising an annular valve seat, an annular valve member seatable on said valve seat, an annular actuating member capable of unseating said valve member when moved from a normally neutral or center position, hydraulic reaction areas formed on said actuating member, said hydraulic reaction areas comprising first and second reaction areas subject to variable pressures, said variable pressures acting in the same direction thereby opposing movement of the valve actuating member away from its normally neutral or center position, pressure regulating valve means limiting the pressure acting on one of said reaction areas to a predetermined value, and operator operated means connected to said actuating valve member, said last mentioned means being sensitive to the pressure build-up on said reaction areas.

14. In a control valve having a housing member and valve means located therein, pressure reaction means associated with said valve means having first and second reaction areas subject to a variable pressure for opposing movement of said valve means from a neutral position, said pressure acting on said areas in the same direction, first and second passage means communicating said reaction areas with said variable pressure, and pressure regulating valve means located in one of said passage means for limiting the pressure acting on one of said reaction areas to a predetermined value.

15. A control valve having a housing with inlet, return, and cylinder ports, valve means located within said housing, hydraulic pressure reaction means associated with said valve means, said reaction means comprising first and second reaction areas subject to a variable pressure for opposing movement of said valve means from a neutral position, said pressure acting on said areas in the same direction, first and second passage means communicating said reaction areas with said variable pressure, and regulating valve means located in one of said passage means for controlling flow in said last mentioned passage means.

16. A control valve having a housing with an inlet, return, and two cylinder ports, valve means located within said housing, pressure reaction means associated with said valve means, said reaction means comprising two reaction areas, both of said reaction areas being initially and simultaneously subjected to the same variable pressure for opposing movement of said valve means from a neutral position during a given direction of movement, said pressure acting on said areas in the same direction during said movement, and pressure regulating means for limiting the pressure acting on one of the reaction areas to a predetermined maximum value.

References Cited in the file of this patent

UNITED STATES PATENTS

| | | |
|---|---|---|
| 2,063,937 | Kundig | Dec. 15, 1936 |
| 2,596,242 | Hill | May 13, 1952 |
| 2,608,263 | Garrison | Aug. 26, 1952 |
| 2,676,663 | Smith | Apr. 27, 1954 |
| 2,690,740 | Huff | Oct. 5, 1954 |